(12) United States Patent
Miyashita

(10) Patent No.: US 7,134,420 B2
(45) Date of Patent: Nov. 14, 2006

(54) IGNITION TIMING CONTROL APPARATUS FOR INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/185,870

(22) Filed: Jul. 21, 2005

(65) Prior Publication Data
US 2006/0021595 A1 Feb. 2, 2006

(30) Foreign Application Priority Data
Jul. 30, 2004 (JP) ............................. 2004-224715

(51) Int. Cl.
F02B 17/00 (2006.01)
F02B 3/04 (2006.01)
F02P 5/15 (2006.01)
F02D 43/00 (2006.01)

(52) U.S. Cl. ................. 123/299; 123/295; 123/406.47; 123/431

(58) Field of Classification Search ................ 123/295, 123/299, 300, 304, 305, 431, 478, 480, 491, 123/179.16; 60/285; 701/104, 105, 112, 701/113
See application file for complete search history.

(56) References Cited

U.S. PATENT DOCUMENTS 5,875,756 A * 3/1999 Kamura et al. ............. 123/295
5,975,047 A * 11/1999 Kamura et al. ............. 123/305
RE36,737 E * 6/2000 Brehob et al. .............. 123/299
6,178,943 B1 * 1/2001 Taga et al. .................. 123/295
6,314,940 B1 11/2001 Frey et al. .................. 123/295
6,340,014 B1 * 1/2002 Tomita et al. ............... 123/295
6,990,956 B1 * 1/2006 Niimi ..................... 123/406.47
7,055,500 B1 * 6/2006 Miyashita et al. ...... 123/406.47
7,055,501 B1 * 6/2006 Tanaka ................... 123/406.47
2003/0029416 A1 * 2/2003 Sauler et al. ............... 123/299
2003/0089331 A1 * 5/2003 Ueda et al. ................. 123/295
2006/0096575 A1 * 5/2006 Araki et al. ............ 123/406.47

FOREIGN PATENT DOCUMENTS

| EP | 0 826 880 A2 | 3/1998 |
| EP | 0 937 880 A2 | 8/1999 |
| EP | 0 943 793 A2 | 9/1999 |
| EP | 1 267 070 A1 | 12/2002 |
| JP | A 2001-020837 | 1/2001 |
| JP | A 2002-227697 | 8/2002 |
| JP | A 2004-270583 | 9/2004 |

* cited by examiner

Primary Examiner—Willis R. Wolfe, Jr.
(74) Attorney, Agent, or Firm—Oliff & Berridge PLC

(57) ABSTRACT

An ignition timing control apparatus for an internal combustion engine having an in-cylinder injector for injecting a fuel into a cylinder and an intake port injector for injecting a fuel into an intake port is configured to correct a basic ignition timing, having been determined corresponding to an operation state, in accordance with a fluctuation of at least one factor affecting the combustion rate selected from a coolant temperature, an intake air temperature and an EGR (exhaust gas recirculation) amount, to set a final ignition timing. The correction amount of the ignition timing is set greater for the port injection than for the in-cylinder injection.

2 Claims, 6 Drawing Sheets

IGNITION TIMING CONTROL APPARATUS FOR INTERNAL COMBUSTION ENGINE

This nonprovisional application is based on Japanese Patent Application No. 2004-224715 filed with the Japan Patent Office on Jul. 30, 2004, the entire contents of which are hereby incorporated by reference.

BACKGROUND OF THE INVENTION

1. Field of the Invention

The present invention relates to an ignition timing control apparatus for an internal combustion engine, and more particularly to an ignition timing control apparatus for a so-called dual injection type internal combustion engine that is provided with an in-cylinder injector for injecting a fuel into a cylinder and an intake port injector for injecting a fuel into an intake port.

2. Description of the Background Art

An internal combustion engine of so-called dual injection type is known from Japanese Patent Laying-Open No. 2001-020837. This internal combustion engine includes an in-cylinder injector for injecting a fuel into a cylinder and an intake port injector for injecting a fuel into an intake manifold or intake port. According to an operation state, switching is made between these injectors for use to achieve for example stratified charge combustion in a low-load operation region and homogeneous combustion in a high-load operation region, or these injectors are simultaneously used while the fuel injection ratio between the injectors is changed to achieve homogeneous lean combustion and homogeneous stoichiometric combustion, thereby improving fuel efficiency characteristics and output characteristics.

Generally, for an internal combustion engine of the fuel injection type, in order to allow proper combustion to occur according to an operation state, a final ignition timing is determined by adding various corrective advance (or retard) values according to an engine state to a basic ignition timing value that is set in advance in association with the operation state and stored for example in a map. Ignition is caused to occur based on the determined final ignition timing for operation.

Regarding the aforementioned dual-injection-type internal combustion engine, because of the difference in injection manner, namely depending on whether the injection manner is the one in which the fuel is injected from the in-cylinder injector or the one in which the fuel is injected from the intake port injector, the temperature of an air-fuel mixture and the state of mixture of the fuel in a combustion chamber could vary. A resultant problem is that, if ignition is simply caused for operation based on an ignition timing value that is set according to an operation state, the ignition timing is improper. That is, since the combustion rate of the air-fuel mixture varies depending on whether the fuel injection manner is the fuel injection by the in-cylinder injector or the fuel injection by the intake port cylinder, the ignition timing has to be set appropriately. Otherwise, such abnormal combustion as knocking occurs or the output power is insufficient.

Further in a transitional operation state where the injection manner is switched from the injection by the in-cylinder injector or from the injection by the intake port injector or the injection ratio between these injectors is changed, the change in injection manner or injection ratio could result in a different port wall temperature and a different inner-cylinder-wall temperature as well as a different amount of fuel sticking to the port wall, the inner cylinder wall and the top wall of the piston as compared with those in a normal state. Accordingly, the temperature of the air-fuel mixture and the state of mixture of the fuel in the combustion chamber could vary. In such a state, if the ignition timing is set to the one corrected monotonously, it will differ from a proper value, which may cause knocking due to excessive advance or insufficient output power due to excessive retard, leading to degradation in fuel efficiency or the like.

SUMMARY OF THE INVENTION

In view of the foregoing conventional problems, an object of the present invention is to provide an ignition timing control apparatus for an internal combustion engine having an in-cylinder injector and an intake port injector, capable of ensuring stable combustion and suppressing degradation in fuel efficiency.

To achieve the above-described object, an ignition timing control apparatus for an internal combustion engine according to an embodiment of the present invention is an ignition timing control apparatus for an internal combustion engine having an in-cylinder injector for injecting a fuel into a cylinder and an intake port injector for injecting a fuel into an intake port, configured to correct a basic ignition timing, having been determined corresponding to an operation state, in accordance with a fluctuation of a factor at least affecting a combustion rate, so as to set a final ignition timing. The correction amount of the ignition timing is set greater for the port injection than for the in-cylinder injection.

Here, the factor at least affecting the combustion rate may be at least one selected from the group consisting of a coolant temperature, an intake air temperature and an EGR (exhaust gas recirculation) amount.

According to the ignition timing control apparatus for an internal combustion engine of the embodiment of the present invention, the basic ignition timing having been determined in correspondence with an operation state is corrected with the correction amount corresponding to the fluctuation of the factor at least affecting the combustion rate, to set the final ignition timing. The correction amount is set greater for the port injection than for the in-cylinder injection. Thus, even during the port injection that is considerably affected by the combustion rate, correction of the ignition timing is carried out appropriately, and therefore, stable operation and improved fuel efficiency are ensured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings. Firstly, an overall configuration of an internal combustion engine of a duel injection type to which the present invention is adapted will be described with reference to FIG. 1.

Figure 1:
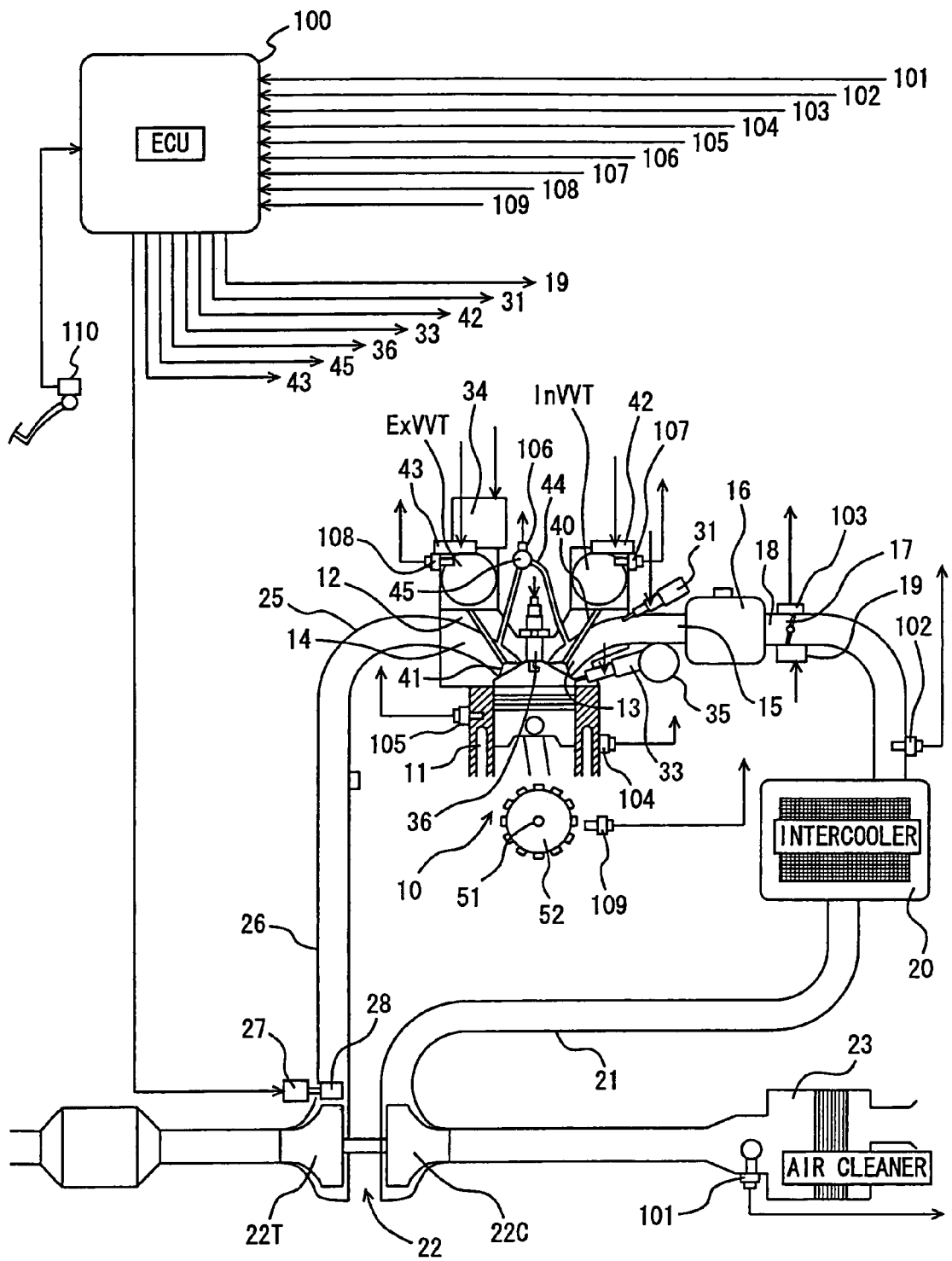
FIG. 1 shows a schematic configuration of an internal combustion engine to which an ignition timing control apparatus according to the present invention is adapted.

FIG. 1 shows an engine with a variable valve timing mechanism and a supercharger (hereinafter, simply referred to as "engine") 10. In FIG. 1, a gasoline engine having an intake port injector 31 and an in-cylinder injector 33 is shown. On top of a cylinder block 11 of engine 10, a cylinder head 12 is provided, in which an intake port 13 and an exhaust port 14 are formed for each cylinder.

As an intake system of engine 10, each intake port 13 is connected to an intake manifold 15, which in turn is connected to a throttle chamber 18 fitted with a throttle valve 17, via a surge tank 16 to which intake paths of the respective cylinders are collectively connected. Throttle valve 17 is driven by a throttle motor 19. An intercooler 20 is mounted upstream of throttle chamber 18. Intercooler 20 is connected via an intake pipe 21 to a compressor 22C of a turbocharger 22 that is an example of a supercharger, and is further connected to an air cleaner 23.

In intake manifold 15, intake port injector 31 is provided immediately upstream of intake port 13 of each cylinder. In cylinder head 12, in-cylinder injector 33 is provided for direct injection of fuel into a combustion chamber of each cylinder in cylinder block 11. Each in-cylinder injector 33 is connected to a fuel delivery pipe 35 to which a high-pressure fuel is supplied from a high-pressure fuel pump 34. Further, a spark plug 36 as well as an igniter is provided for each cylinder at cylinder head 12.

As an exhaust system of engine 10, each exhaust port 14 at cylinder head 12 is connected to an exhaust manifold 25 where the exhaust gas is collected. Exhaust manifold 25 is connected to an exhaust pipe 26, and a turbine 22T of turbocharger 22 is fitted to exhaust pipe 26. A catalyst, a muffler and others are provided downstream thereof, open to the atmosphere. Turbocharger 22 has its compressor 22C driven to rotate by energy of the exhaust gas flowing into turbine 22T, to suction, pressurize and supercharge the air. At the intake side of turbine 22T, a variable nozzle 28 having a variable nozzle actuator 27 formed of an electric actuator is provided so as to adjust the flow rate and pressure of the exhaust gas flowing in. Variable nozzle actuator 27 adjusts the degree of opening of variable nozzle 28 in accordance with a control signal output from an electronic control unit (hereinafter, "ECU") 100 as will be described later, to thereby control the supercharge pressure.

The variable valve timing mechanism of engine 10 will now be described. As is well known, rotation of a crankshaft 51 of engine 10 is transmitted to an intake camshaft and an exhaust camshaft provided in cylinder head 12, via a not-shown crank pulley fixed to crankshaft 51, a timing belt, an intake cam pulley, an exhaust cam pulley and others, such that crankshaft 51 and the camshafts have rotational angles in the ratio of 2:1. The intake cam provided at the intake camshaft and the exhaust cam provided at the exhaust camshaft (both not shown) open/close an intake valve 40 and an exhaust valve 41, respectively, based on the rotations of the camshafts controlled to maintain the rotational angles in the ratio of 2:1 between crankshaft 51 and themselves.

Between the intake camshaft and the intake cam pulley, a hydraulic variable valve timing mechanism InVVT is provided, which continuously changes the rotational phase (displacement angle) of the intake camshaft with respect to crankshaft 51 by rotating the intake cam pulley and the intake camshaft relative to each other. As is well known, variable valve timing mechanism InVVT has its hydraulic pressure controlled by an oil control valve 42 formed of a linear solenoid valve, a duty solenoid valve or the like, and is actuated by a drive signal from ECU 100 controlling the engine, which will be described later.

Similarly, a hydraulic variable valve timing mechanism ExVVT is provided between the exhaust camshaft and the exhaust cam pulley to continuously change the rotational phase (displacement angle) of the exhaust camshaft with respect to crankshaft 51 by rotating the exhaust cam pulley and the exhaust camshaft relative to each other. Variable valve timing mechanism ExVVT, similarly to variable valve timing mechanism InVVT on the intake side, has its hydraulic pressure controlled by an oil control valve 43, and is actuated by a drive signal from ECU 100 controlling the engine, which will be described later.

An exhaust gas recirculation (hereinafter, "EGR") path 44 is provided between the above-described intake port 13 and exhaust port 14, and its degree of opening is controlled by an EGR valve 45 provided in the midstream of the path.

Various sensors for detecting the engine operation states will now be described. An airflow meter 101 is provided at intake pipe 21 immediately downstream of air cleaner 23, and an intake air temperature sensor 102 is fitted immediately downstream of intercooler 20. In relation to throttle valve 17 provided at throttle chamber 18 and for adjusting the quantity of the air, a throttle position sensor 103 is placed to detect the degree of opening of the valve 17. Further, a knock sensor 104 is attached to the wall of cylinder block 11 of engine 10, and a coolant temperature sensor 105 is also attached to cylinder block 11 to detect the temperature of the coolant. An EGR valve opening degree sensor 106 is also placed to detect the degree of opening of EGR valve 45.

For detecting the actuated positions of the above-described variable valve timing mechanism InVVT on the intake side and variable valve timing mechanism ExVVT on the exhaust side, a cam position sensor 107 on the intake side and a cam position sensor 108 on the exhaust side are provided respectively. Each cam position sensor detects a plurality of projections provided at equal angles on the periphery of a cam rotor that is secured to and rotates in synchronization with the intake or exhaust camshaft correspondingly thereto, and outputs a cam position pulse representing the cam position. Further, a crank position sensor 109 is provided, which detects projections provided at intervals of a prescribed crank angle on the periphery of a crank rotor 52 that is secured to and rotates in synchronization with crankshaft 51, and outputs a crank pulse representing the crank angle. An accelerator press-down degree sensor 110 is also provided, which generates an output voltage proportional to the amount of press down of the accelerator pedal.

In FIG. 1, an electronic control unit (ECU) 100 processes signals from the above-described sensors and calculates controlled variables for various actuators, so as to carry out fuel injection control, ignition timing control, idle engine speed control, supercharge pressure control, valve timing control for the intake and exhaust valves, and others. ECU 100 is constituted centrally of a microcomputer to which a CPU, a ROM, a RAM, a backup RAM, a counter/timer group, an I/O interface and others are connected via a bus line, and has a constant voltage circuit for supplying stabilized power to the respective parts, a drive circuit connected to the I/O interface, and a peripheral circuit such as an A/D converter and others incorporated therein. Further, at the input port of the I/O interface, airflow meter 101, intake air temperature sensor 102, throttle position sensor 103, knock sensor 104, coolant temperature sensor 105, EGR valve opening degree sensor 106, cam position sensors 107, 108, crank position sensor 109, accelerator press-down degree sensor 110 and others are connected.

At the output port of the I/O interface, throttle motor 19, variable nozzle actuator 27, intake port injector 31, in-cylinder injector 33, EGR valve 45, spark plug 36, oil control valves 42, 43 and others are connected via the drive circuit.

ECU 100 processes the detection signals and others from the sensors input via the I/O interface, according to a control program stored in the ROM. It carries out the engine operation control including the fuel injection quantity and timing control, the ignition timing control, the supercharge pressure control, the valve timing control and others, based on various data stored in the RAM, various learned value data stored in the backup RAM, fixed data of control maps stored in the ROM, and others.

Figure 2:
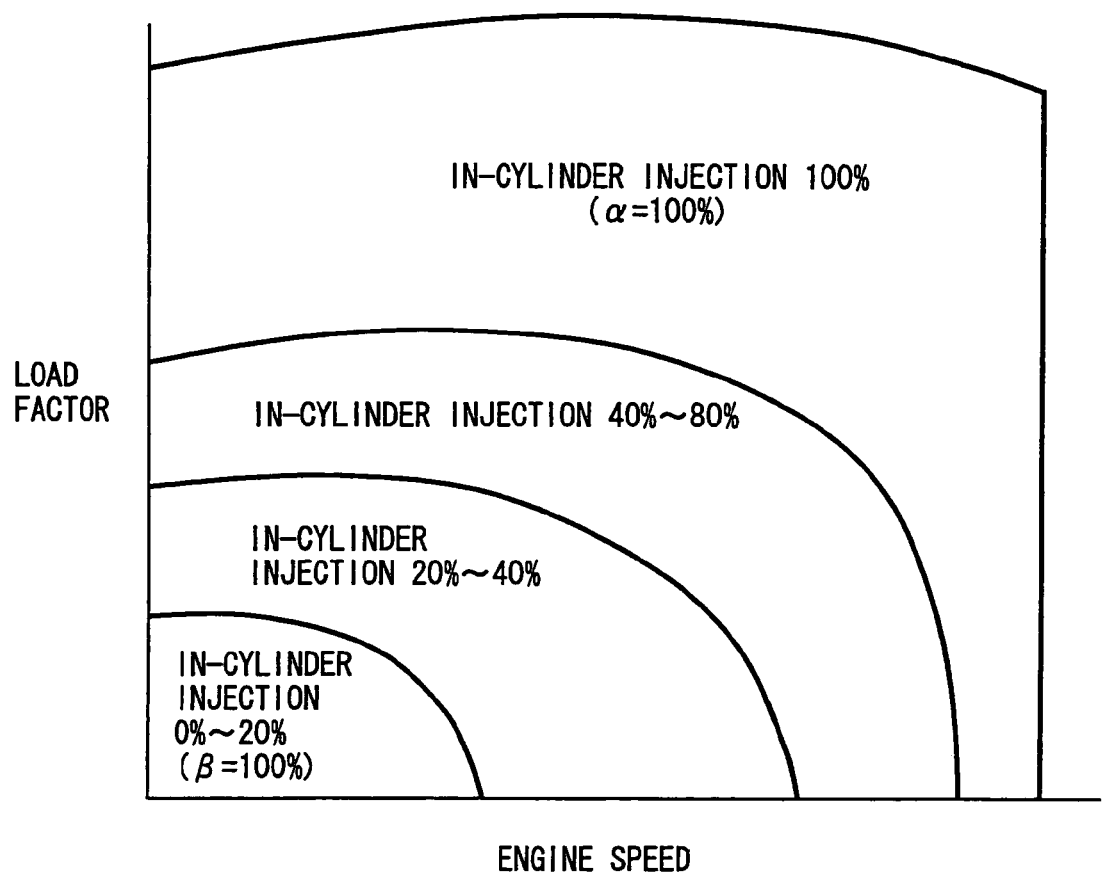
FIG. 2 is a graph showing injection manners and injection ratios in correspondence with the operation regions in an embodiment of the present invention.

In engine 10 of the present embodiment, for example, a combustion manner or an injection manner is set in correspondence with the operation region or a condition map as shown in FIG. 2, and ratio α and ratio β of injection from in-cylinder injector 33 and intake port injector 31, respectively, are determined. Here, in-cylinder injection ratio α represents a ratio of a quantity of fuel injected from in-cylinder injector 33 to the total fuel injection quantity, while port injection ratio β represents a ratio of a quantity of fuel injected from intake port injector 31 to the total fuel injection quantity. Here, α+β=100%. In FIG. 2, in-cylinder injection 100% represents a region where ratio α of injection only from in-cylinder injector 33 is set to 100%, that is, β=0%. Meanwhile, in-cylinder injection 0% represents a region where ratio β of injection only from intake port injector 31 is set to 100%, that is, α=0%. Furthermore, in-cylinder injection 40–80% means that α is set to 40–80% and β is set to 60–20%; however, values for ratio α and ratio β may be varied as appropriate, in accordance with the operation condition required to engine 10 that is used.

As described above, in engine 10 of the present embodiment, the injection manner is changed in accordance with the engine operation state, so as to ensure homogeneity of an air-fuel mixture and to improve output of engine 10 in the high-load region. Specifically, use of intake port injector 31 tends to promote homogeneity of the air-fuel mixture, as compared with the use of in-cylinder injector 33. Accordingly, in the operation region from low load to intermediate load, in-cylinder injector 33 and intake port injector 31 are used to attain a different fuel injection ratio therebetween so as to ensure homogeneity of the air-fuel mixture and to improve combustion. Meanwhile, when in-cylinder injector 33 is used for fuel injection, due to the latent heat of vaporization, lowering in the temperature of the air-fuel mixture and hence in the temperature in the combustion chamber is more likely than when intake port injector 31 is used for fuel injection. Therefore, in-cylinder injector 33 is used in the high-load operation region, so that efficiency in charging the air is enhanced and engine output is improved.

Here, the ignition timing control of engine 10 according to the present embodiment is firstly described in brief ECU 100 obtains a basic ignition timing that is defined for each injection manner such as port injection, in-cylinder injection and simultaneous injection thereof and set in a two-dimensional map as the ignition timing ensuring a maximum engine output, based on the engine operation state represented by parameters such as engine speed, engine load factor and the like. It then performs appropriate advance or retard correction with respect to the obtained basic ignition timing, with various correction amounts corresponding to fluctuations of the factors that will at least affect the combustion rate, so as to set a final ignition timing based on the following expression. Here, the final ignition timing refers to the timing at which ignition is caused at each cylinder, which is represented by a crank angle (before top dead center; BTDC) with reference to the top dead center of the cylinder.

Final Ignition Timing=Basic Ignition Timing±Correction Amounts ECU 100 outputs an ignition signal that is turned on at the timing indicated by the final ignition timing thus calculated, to the igniter of spark plug 21 of each cylinder, so as to cause ignition.

Figure 3:
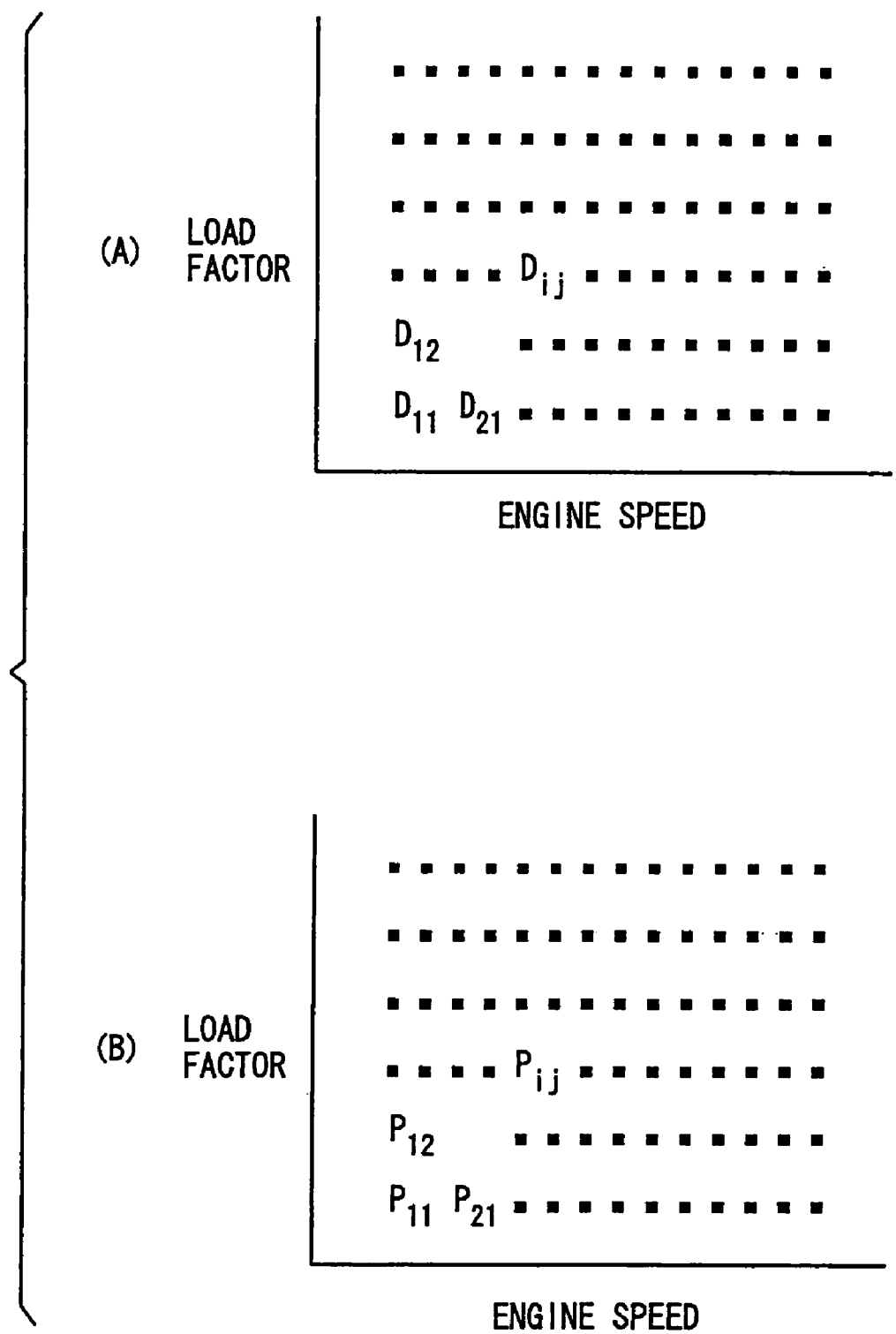
FIG. 3 shows basic maps of basic ignition timing values stored in correspondence with the operation states in an embodiment of the present invention, where (A) shows a basic map A storing the basic ignition timing values at the time of 100% direct injection, and (B) shows a basic map B storing the basic ignition timing values at the time of 100% port injection.

In the present embodiment, the basic ignition timing values are set respectively for the case where fuel injection ratio α from in-cylinder injector 33 is 100% (hereinafter, also referred to as "100% direct injection") and for the case where fuel injection ratio β from intake port injector 31 is 100% (hereinafter, also referred to as "100% port injection"). That is, as shown in (A) and (B) of FIG. 3, the basic ignition timing values are stored in association with the operation states in basic maps A and B that are two-dimensional maps with the vertical and horizontal axes representing load factor and engine speed, respectively. More specifically, basic map A stores data of a basic ignition timing value Dij at the time of 100% direct injection, and basic map B stores data of a basic ignition timing value Pij at the time of 100% port injection. Here, basic ignition timing values Dij and Pij are each represented by a crank angle with reference to the top dead center. In the operation state where in-cylinder injector 33 and intake port injector 31 are both used for fuel injection at prescribed fuel injection ratio α and/or β, a proper ignition timing value (D+P)ij corresponding to the relevant fuel injection ratio α and/or β is obtained from the above-described basic maps A and B, by interpolation of basic ignition timing values Dij and Pij set respectively therein.

Meanwhile, the correction amounts described above are obtained through experiments in advance and stored in maps for at least coolant temperature, intake air temperature and EGR amount, for example, which are the factors affecting the combustion rate.

Figure 4:
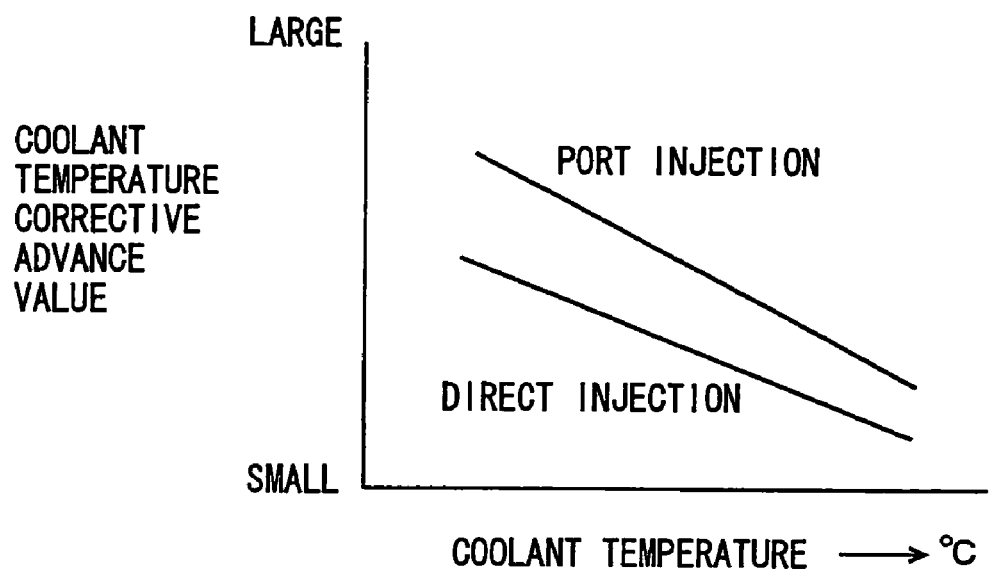
FIG. 4 is a map storing coolant temperature corrective advance values determined in accordance with changes in coolant temperature, according to an embodiment of the present invention.

Firstly, as the correction amount related to the coolant temperature, a coolant temperature corrective advance value is set in accordance with a change in coolant temperature, as shown in the map of FIG. 4 of which horizontal and vertical axes represent the coolant temperature (° C.) and the coolant temperature corrective advance value (° C.A), respectively. The coolant temperature corrective advance value is set for stabilizing combustion during the warm-up operation of the engine. In the cold state of the engine where the coolant temperature is low, the combustion rate is slow. Thus, the coolant temperature corrective advance value is set greater as the coolant temperature is lower, to further advance the ignition timing for the purposes of stable operation and improved fuel efficiency. In the case of direct injection, only the wall temperature inside the cylinder experiences a considerable influence of the coolant temperature. By comparison, in the case of port injection, the influence of the coolant temperature is greater than in the direct injection, since it also affects the wall temperature of the intake port. Thus, for further stabilization of combustion, the coolant temperature corrective advance value is set greater for the port injection than for the in-cylinder injection (direct injection). The port injection and the direct injection in FIG. 4 refer to the coolant temperature corrective advance values upon 100% port injection and 100% direct injection, respectively.

Figure 5:
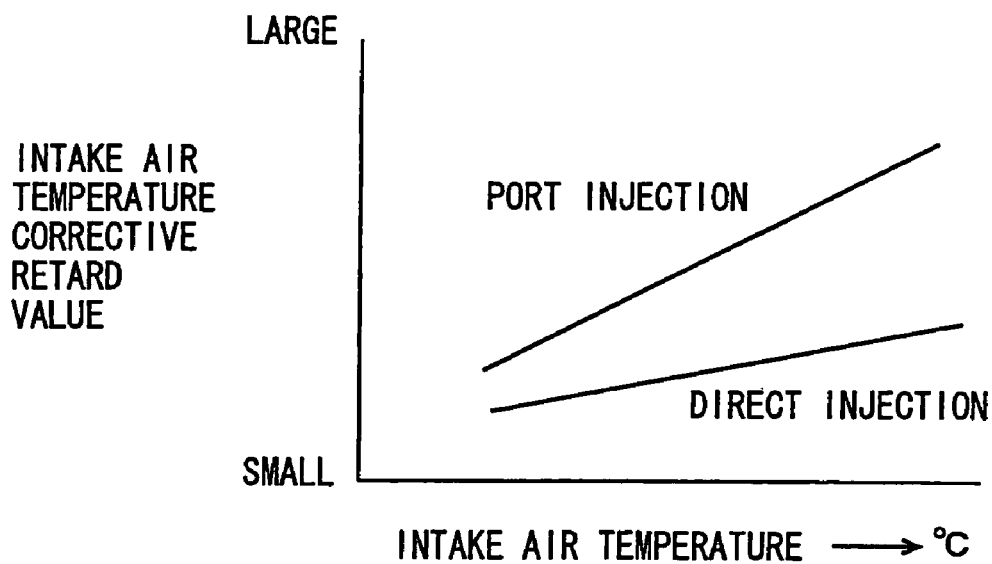
FIG. 5 is a map storing intake air temperature corrective advance values determined in accordance with changes in intake air temperature, according to an embodiment of the present invention.

Next, as the correction amount related to the intake air temperature, an intake air temperature corrective retard value is set in accordance with a change in intake air temperature, as shown in the map of FIG. 5 of which horizontal and vertical axes represent the intake air temperature (° C.) and the intake air temperature corrective retard value (° C.A), respectively. Since the combustion rate is faster as the intake air temperature is higher, the intake air temperature corrective retard value is set such that the retarded amount is increased as the intake air temperature is higher, so as to further retard the ignition timing for the purposes of stable operation and improved fuel efficiency. Further, since the influence of the intake air temperature is greater during the port injection, the intake air temperature corrective retard value is set greater for the port injection than for the in-cylinder injection. This is because the effect of cooling the intake air by latent heat of vaporization of the fuel is large during the in-cylinder injection, and thus, a favorable cooling effect is expected even if the intake air temperature is high. The port injection and the direct injection in FIG. 5 refer to the intake air temperature corrective retard values upon 100% port injection and 100% direct injection, respectively.

Figure 6:
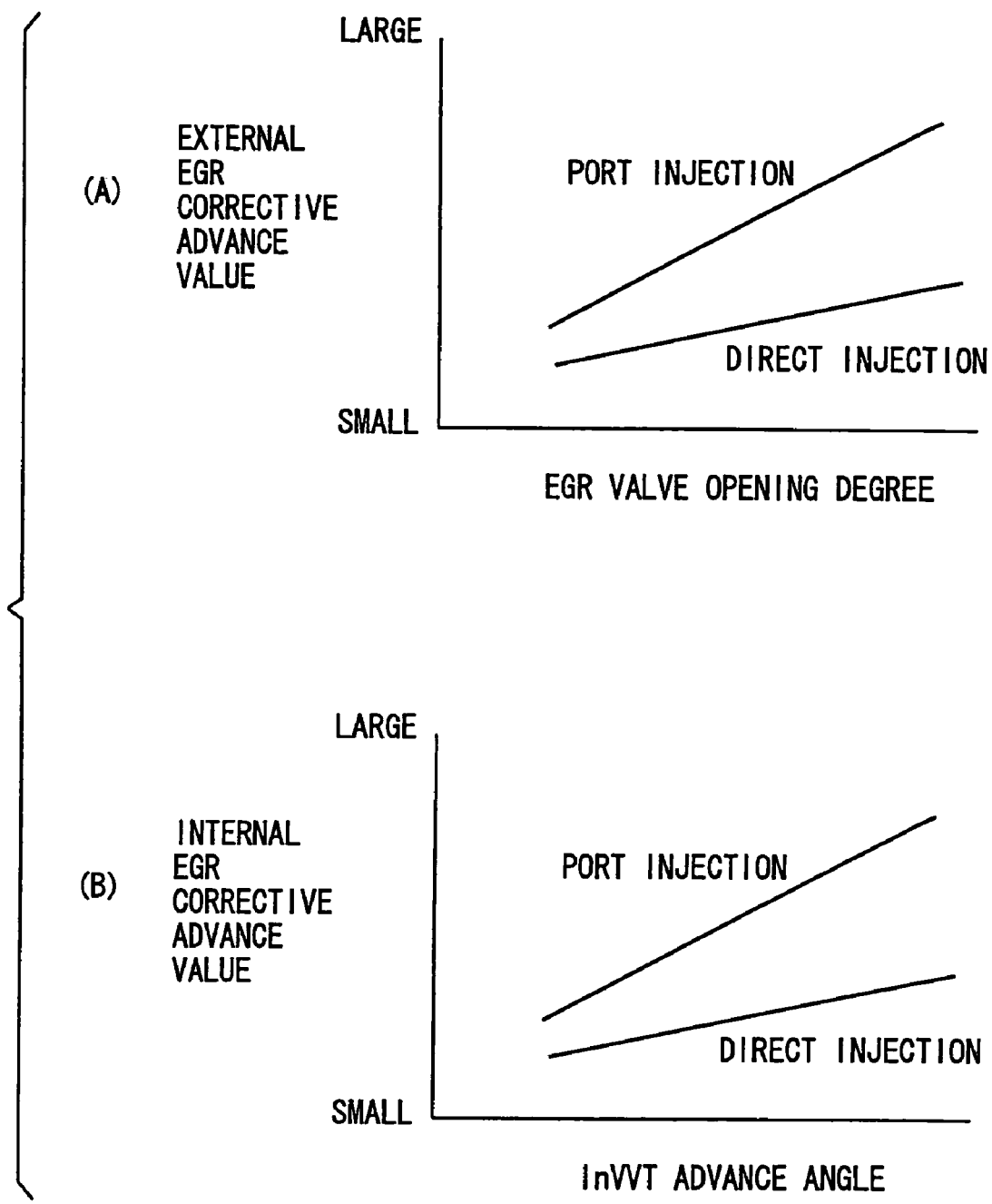
FIG. 6 shows maps storing EGR corrective advance values determined in accordance with changes in EGR amount according to an embodiment of the present invention, where (A) shows the external EGR corrective advance values determined in accordance with the degrees of opening of an EGR valve, and (B) shows the internal EGR corrective advance values determined in accordance with the InVVT advance angles.

Further, as the correction amount related to the EGR amount, an external EGR corrective advance value is determined in accordance with the degree of opening of EGR valve 45 and hence a change in external EGR amount, as shown in the map of FIG. 6(A) of which horizontal and vertical axes represent the EGR valve opening degree and the external EGR corrective advance value (° C.A), respectively. Further, an internal EGR corrective advance value is determined, as in the map of FIG. 6(B) with its horizontal axis representing an InVVT advance angle that is the displacement angle of the intake camshaft in variable valve timing mechanism InVVT on the intake side and its vertical axis representing the internal EGR corrective advance value (° C.A), in accordance with the InVVT advance angle that determines the valve overlap amount and hence a change in internal EGR amount. In either case, the combustion rate becomes slower as the EGR amount increases. Thus, the EGR corrective advance value is set greater as the EGR amount is greater, so as to further advance the ignition timing for the purposes of stable operation and improved fuel efficiency. In the in-cylinder injection, it is easy to form a stratified air-fuel mixture at the time of stratified charge combustion and also a semi stratified air-fuel mixture at the time of homogenous combustion, and thus, the influence of the EGR is relatively small. By comparison, the port injection experiences a greater influence of the EGR. As such, the external and internal EGR corrective advance values are set greater for the port injection than for the in-cylinder injection. The port injection and the direct injection in (A) and (B) of FIG. 6 refer to the external and internal EGR corrective advance values upon 100% portion injection and 100% direct injection, respectively, as in the above-described cases.

The EGR amount increases as the valve overlap amount increases. From such a relation between the valve overlap amount and the EGR amount, although not shown, the internal EGR corrective advance value described above may be set such that it becomes greater as the increase of an ExVVT retard angle that is the displacement angle of the exhaust camshaft in the exhaust-side variable valve timing mechanism ExVVT.

Further, as to the correction amounts described above, in the operation state where fuel injection is carried out using both in-cylinder injector 33 and intake port injector 31 at prescribed fuel injection ratio $\alpha$ and/or $\beta$, the correction amounts corresponding to the relevant fuel injection ratio $\alpha$ and/or $\beta$ is obtained by interpolation, as in the case of the basic ignition timing value.

Hereinafter, an embodiment of a control routine of the ignition timing control apparatus of engine 10 having the above-described configuration will be described with reference to the flowchart in FIG. 7. This control routine is carried out at every 180-degree rotation of crankshaft 51, as a part of normal control routine for controlling the engine to an optimal state, including the fuel injection control with which the fuel injection quantity and timing are obtained based on the engine speed and the engine load obtained in relation to the control target from airflow meter 101, an intake pipe pressure sensor or accelerator press-down degree sensor 110, the valve overlap amount control with which intake valve 40 and exhaust valve 41 are both set to an open state by valve timing control via variable valve timing mechanisms InVVT and ExVVT, and the supercharge pressure control via turbocharger 22.

Firstly, when the control is initiated, in step S701, ECU 100 reads the engine load obtained by detection from accelerator press-down degree sensor 110 or airflow meter 101 and the engine speed obtained by calculation from crank position sensor 109, at every prescribed time, and also acquires the fuel injection ratio corresponding to the relevant operation state, which is 100% in-cylinder injection where fuel is injected only from in-cylinder injector 33, or 100% port injection (0% in-cylinder injection) where fuel is injected only from intake port injector 31, or a prescribed ratio between fuel injection from intake port injector 31 and fuel injection from in-cylinder injector 33.

Next, in step S702, a basic ignition timing is calculated based on the acquired fuel injection ratio, in accordance with basic maps A and B described above. For example, in the case of 100% direct injection, the value corresponding to the operation state is obtained directly from basic map A. In the case of direct injection of $\alpha$%, interpolation is carried out using basic maps A and B.

Next, in step S703, the coolant temperature detected by coolant temperature sensor 105 is read. Then, from the map shown in FIG. 4, the coolant temperature corrective advance value at the time of 100% in-cylinder injection (direct injection) is acquired in step S704, and the coolant temperature corrective advance value at the time of 100% port injection is acquired in step S705. Further, in step S706, the coolant temperature corrective advance value corresponding to the fuel injection ratio acquired in step S701 is calculated by interpolation of the coolant temperature corrective advance values upon 100% direct injection and upon 100% port injection acquired in steps S704 and S705, respectively.

Next, in step S707, the intake air temperature detected by intake air temperature sensor 102 is read. Then, from the map shown in FIG. 5, the intake air temperature corrective retard value at the time of 100% direct injection is acquired in step S708, and the intake air temperature corrective retard value at the time of 100% port injection is acquired in step S709. Further, in step S710, the intake air temperature corrective retard value corresponding to the fuel injection ratio obtained in step S701 is calculated by interpolation of the intake air temperature corrective retard values upon 100% direct injection and upon 100% port injection acquired in steps S708 and S709, respectively.

Next, in step S711, the EGR valve opening degree detected by EGR valve opening degree sensor 106 is read. Then, from the map shown in FIG. 6(A), the external EGR corrective advance value at the time of 100% direct injection is acquired in step S712, and the external EGR corrective advance value at the time of 100% port injection is acquired in step S713. Further, in step S714, the final external EGR corrective advance value corresponding to the fuel injection ratio obtained in step S701 is calculated by interpolation of the external EGR corrective advance values upon 100% direct injection and upon 100% port injection acquired in steps S712 and S713, respectively.

Next, in step S715, the InVVT advance angle obtained via detection by cam position sensor 107 on the intake-side is read. Then, from the map shown in FIG. 6B), the internal EGR corrective advance value at the time of 100% direct injection is acquired in step S716, and the internal EGR corrective advance value at the time of 100% port injection is acquired in step S717. Further, in step S718, the final internal EGR corrective advance value corresponding to the fuel injection ratio obtained in step S701 is calculated by interpolation of the internal EGR corrective advance values upon 100% direct injection and upon 100% port injection acquired in steps S716 and S717, respectively.

Further, in step S719, the ExVVT retard angle obtained via detection by cam position sensor 108 on the exhaust side is read. Then, from a map not shown, the internal EGR corrective advance value at the time of 100% direct injection is acquired in step S720, and the internal EGR corrective advance value at the time of 100% port injection is acquired in step S721. Further, in step S722, the final internal EGR corrective advance value corresponding to the fuel injection ratio obtained in step S701 is calculated by interpolation of the internal EGR corrective advance values upon 100% direct injection and upon 100% port injection acquired in steps S720 and S721, respectively.

Finally, in step S723, the coolant temperature corrective advance value calculated in step S706, the intake air temperature corrective retard value calculated in step S710, the external EGR corrective advance value calculated in step S714, the internal EGR corrective advance value calculated in step S718, and the internal EGR corrective advance value calculated in step S722 are added to or subtracted from the basic ignition timing calculated in step S702, to thereby obtain the final ignition timing. ECU 100 then outputs an ignition signal that is turned on at the timing indicated by the final ignition timing thus calculated, to the igniter of spark plug 21 of each cylinder to cause ignition.

Figure 7:
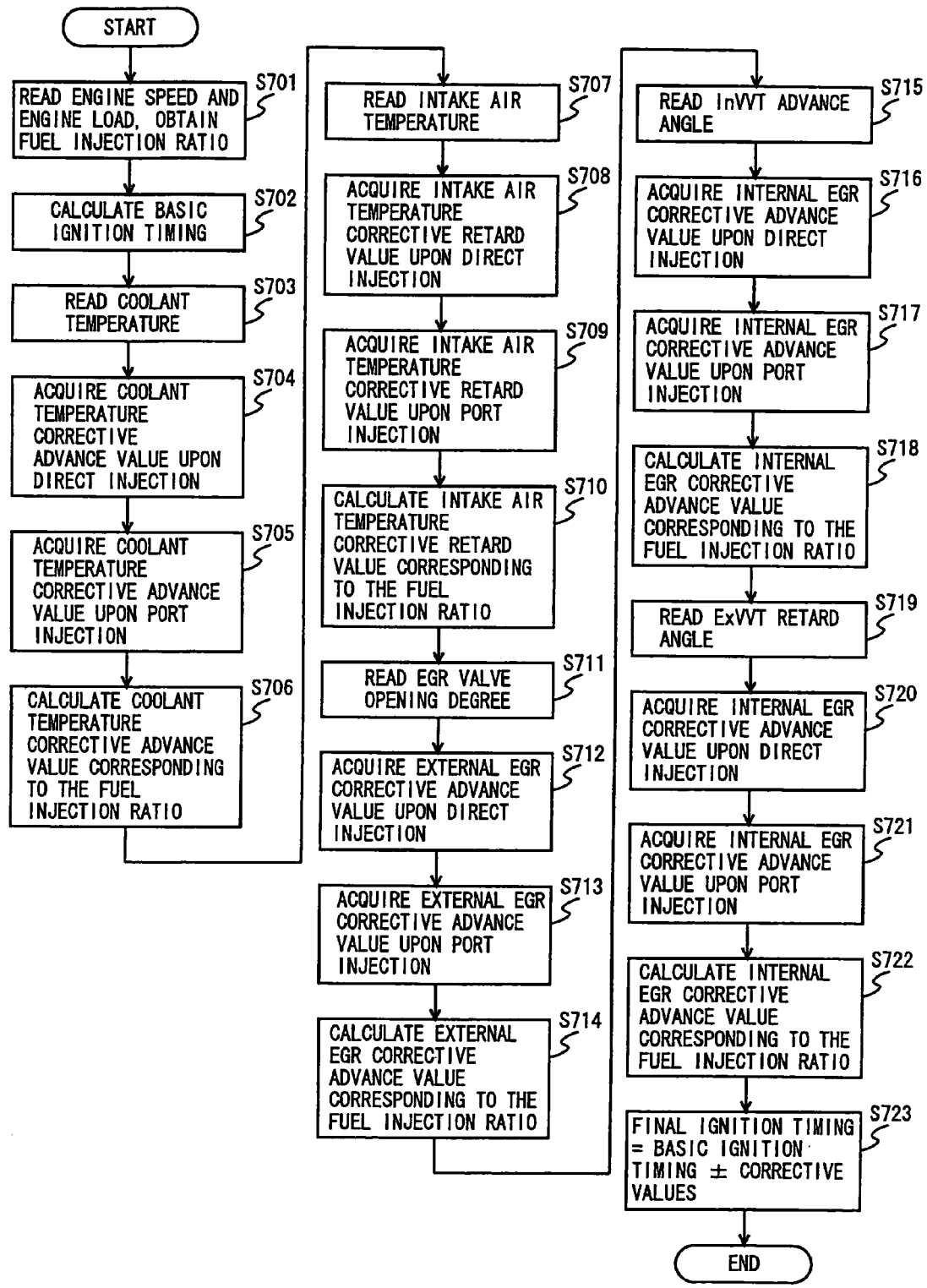
FIG. 7 is a flowchart illustrating an example of control procedure in an embodiment of the present invention.

In the flowchart of FIG. 7 explained above, when engine 10 is in the operation state of 100% direct injection or 100% port injection, interpolation for obtaining each of the correction amounts is skipped and the correction amounts are obtained directly from the maps corresponding to the operation state. Further, as to the internal EGR corrective advance value described above, the valve overlap may be controlled by valve timing control via only one of variable valve timing mechanisms InVVT and ExVVT with respect to the intake and exhaust camshafts. In such a case, steps S715-S718 or steps S719-S722 are not conducted in the flowchart of FIG. 7.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ignition timing control apparatus for an internal combustion engine having an in-cylinder injector for injecting a fuel into a cylinder and an intake port injector for injecting a fuel into an intake port, configured to correct a basic ignition timing, having been determined corresponding to an operation state, in accordance with a fluctuation of a factor at least affecting a combustion rate, to set a final ignition timing, wherein a correction amount of the ignition timing is set greater for the port injection than for the in-cylinder injection.

2. The ignition timing control apparatus for an internal combustion engine according to claim 1, wherein said factor at least affecting the combustion rate is at least one selected from the group consisting of a coolant temperature, an intake air temperature and an EGR (exhaust gas recirculation) amount.

* * * * *